United States Patent
Ferry

Patent Number: 5,534,699
Date of Patent: Jul. 9, 1996

[54] DEVICE FOR SEPARATING AND RECOMBINING CHARGED PARTICLE BEAMS

[75] Inventor: James A. Ferry, Middleton, Wis.

[73] Assignee: National Electrostatics Corp., Middleton, Wis.

[21] Appl. No.: 506,778

[22] Filed: Jul. 26, 1995

[51] Int. Cl.⁶ .................................................. H01J 3/22
[52] U.S. Cl. .......................... 250/396 R; 250/396 ML; 250/296; 250/294
[58] Field of Search ................... 250/396 R, 396 ML, 250/298, 296, 294, 292, 291, 281; 313/361.1, 426

[56] References Cited

U.S. PATENT DOCUMENTS

| | | | |
|---|---|---|---|
| 3,138,706 | 6/1964 | Brown et al. | 250/41.9 |
| 3,469,118 | 9/1964 | Herb et al. | 310/6 |
| 3,789,298 | 1/1974 | Herb | 324/71 EB |
| 4,037,100 | 7/1977 | Purser | 250/281 |
| 4,191,887 | 3/1980 | Brown | 250/396 ML |
| 4,409,486 | 10/1983 | Bates | 250/396 ML |
| 4,489,237 | 12/1984 | Litherland et al. | 250/287 |
| 4,524,275 | 6/1985 | Cottrell et al. | 250/298 |
| 4,723,076 | 2/1988 | Bateman | 250/296 |
| 4,754,135 | 6/1988 | Jackson | 250/287 |
| 4,766,314 | 8/1988 | Jung | 250/296 |
| 4,804,879 | 2/1989 | Fukumoto | 313/361.1 |
| 4,973,841 | 11/1990 | Purser | 250/282 |
| 5,013,923 | 5/1991 | Litherland et al. | 250/396 R |
| 5,166,518 | 11/1992 | Freedman | 250/296 |
| 5,189,304 | 2/1993 | De Chambost et al. | 250/296 |
| 5,237,174 | 8/1993 | Purser | 250/281 |
| 5,276,330 | 1/1994 | Gesley | 250/396 R |
| 5,315,118 | 5/1994 | Mous | 250/396 ML |
| 5,376,787 | 12/1994 | Smith | 250/281 |

OTHER PUBLICATIONS

"1979 Particle Accelerator Conference Accelerator Engineering and Technology" *Nuclear Science*, Jun. 1979. K. L. Brown.

"Injection Systems for AMS: Simultaneous Versus Sequential" *Nuclear Instruments and Methods in Physics Research* (1990) Southon et al.

*Primary Examiner*—Jack I. Berman
*Assistant Examiner*—Kiet T. Nguyen
*Attorney, Agent, or Firm*—Lathrop & Clark

[57] ABSTRACT

An apparatus employs two spaced apart dipole magnets. An ion beam containing carbon of mass 2, 13 and 14 is focused by an Einzel lens and is directed into a first dipole magnet. The first magnet causes the beam to bend approximately 70 degrees, which separates the mass 12, 13 and 14 ions while at the same time focusing them in the X direction or deflection plane. The ions exit the first dipole magnet and pass through a blanking plate which can selectively remove one or two of the beams of mass 12, 13 and 14 ions. After leaving the first bending magnet, the mass 12 and 14 beams pass through a steering device so the trajectories of the mass 12 and 14 ions are deflected a few degrees to bring them parallel to the mass 13 ion beam. The parallel ion beams next pass through an electrostatic slot lens which focuses the beams in the direction out of the bending plane. After passing through the slot lens, the mass 12 and 14 beams are deflected in like amount to the deflection at the first steering device. The beams then pass through a second blanking plate and enter a second dipole magnet which bends the beams to approximately 70 degrees wherein the beams are combined where they exit from the second dipole magnet. The combined beam enters an Einzel lens where the beam is focused in preparation for injection into a tandem accelerator.

22 Claims, 5 Drawing Sheets

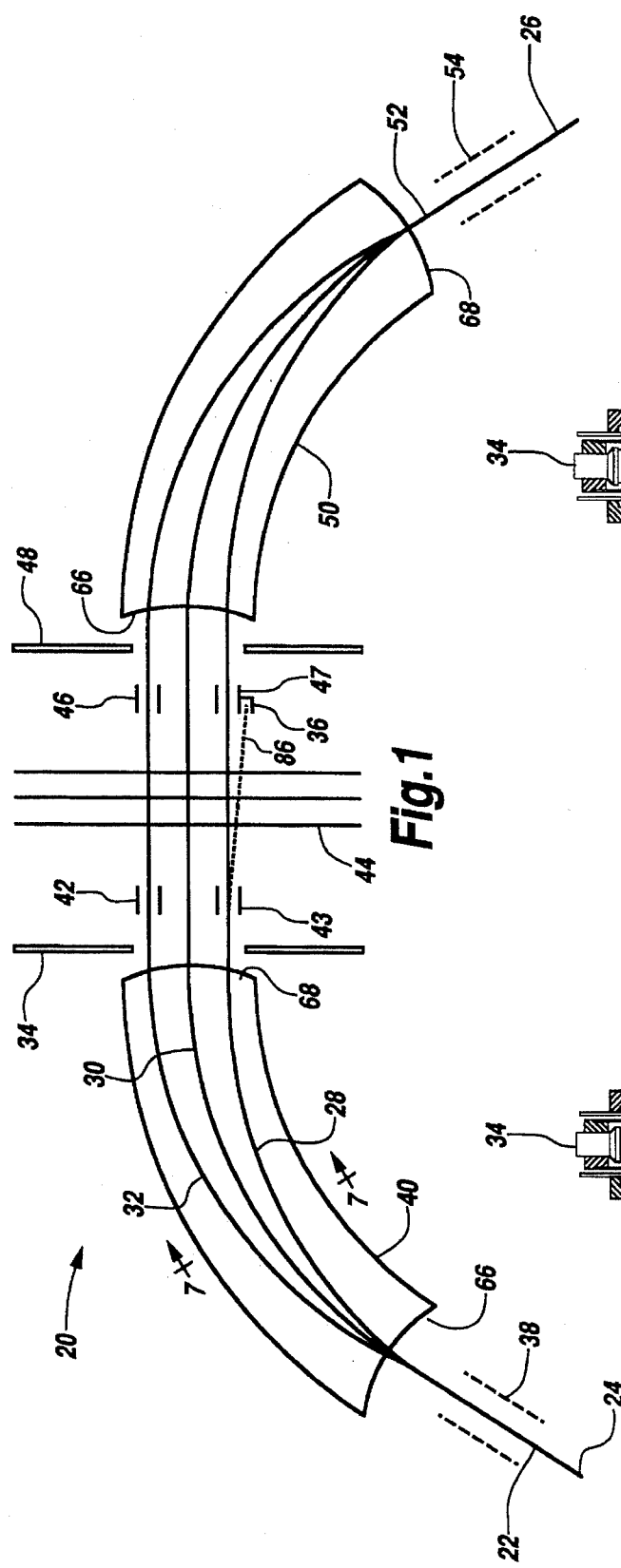
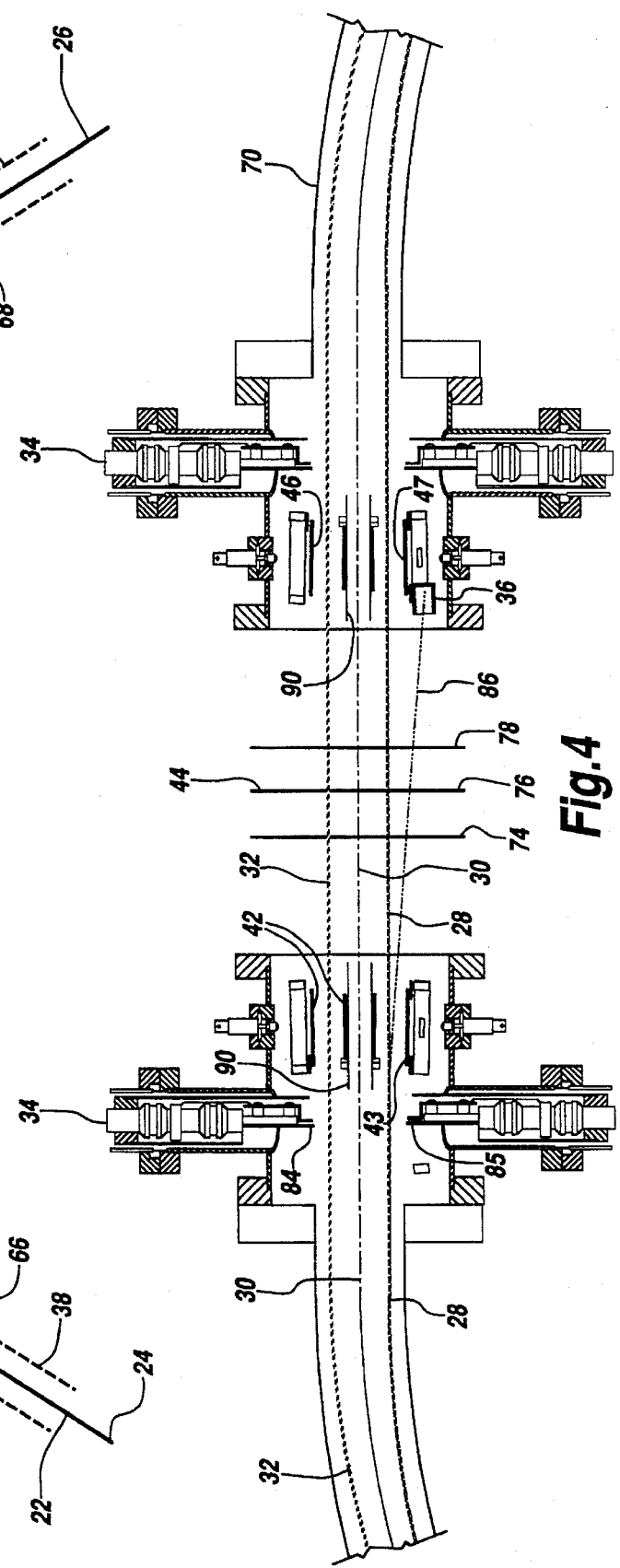

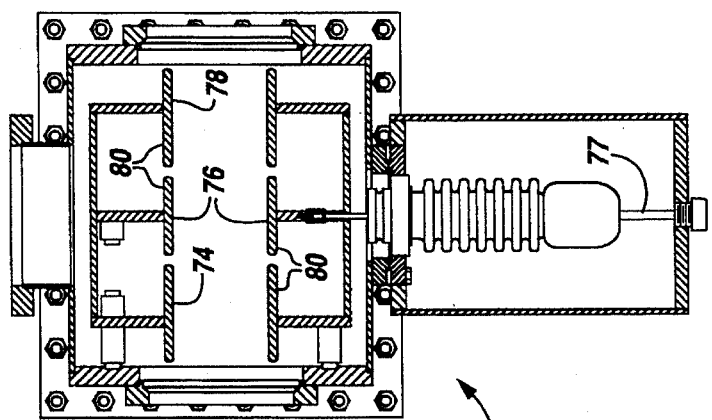
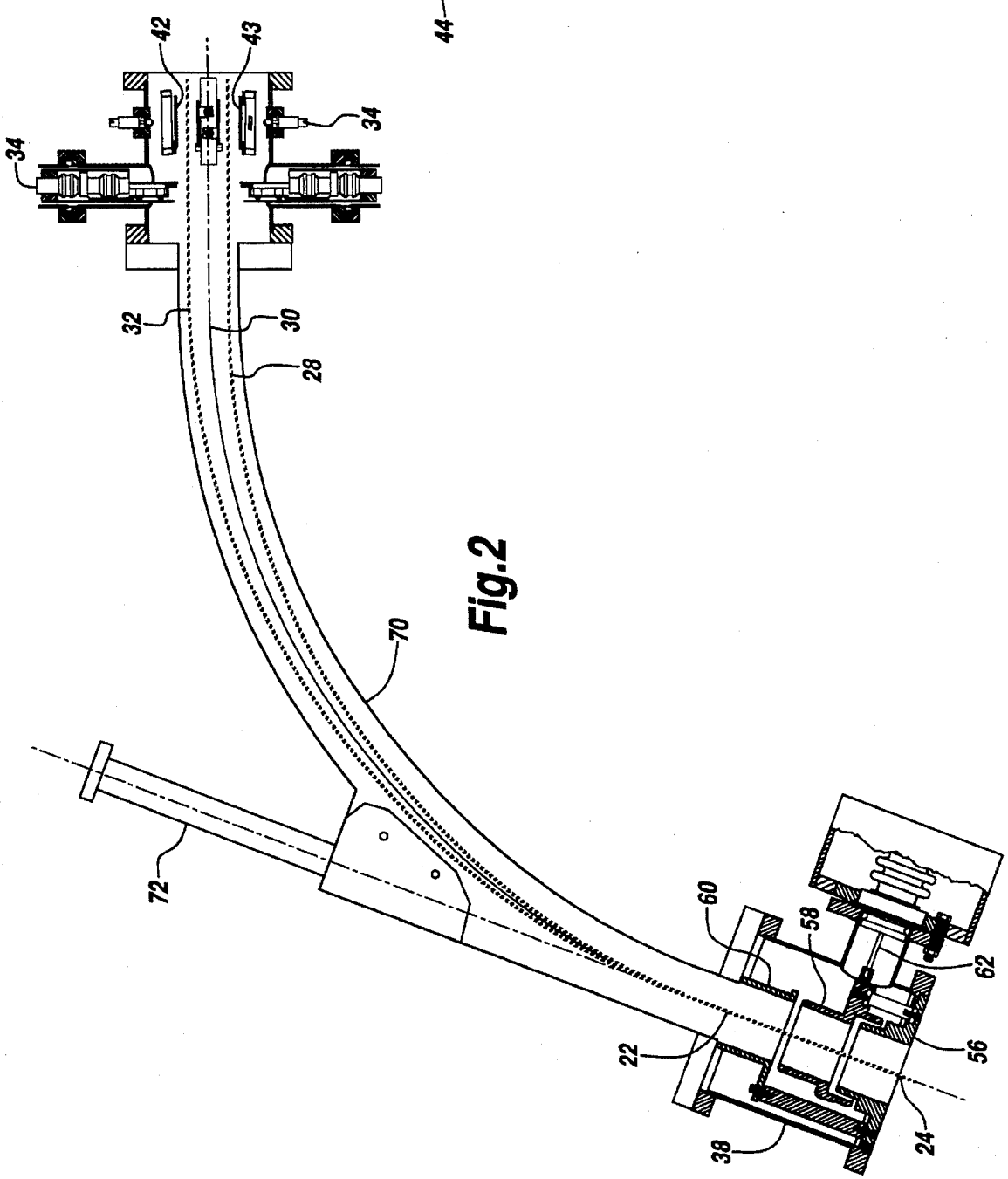

5,534,699

DEVICE FOR SEPARATING AND RECOMBINING CHARGED PARTICLE BEAMS

FIELD OF THE INVENTION

The present invention relates to apparatus for mass spectrometry in general and to apparatus for measuring the concentration of isotopes present in trace amounts, in particular the measurement of the relative abundance of $^{14}C$ with respect to $^{13}C$ and $^{12}C$

BACKGROUND OF THE INVENTION

There are three carbon isotopes that occur naturally in living matter: $^{12}C$ which makes up approximately 99 percent of naturally occurring carbon; $^{13}C$ which makes up approximately 1 percent of naturally occurring carbon; and radioactive $^{14}C$ which has a natural abundance in parts per trillion.

In 1946 Willard Libby developed a technique of age determination using radioactive $^{14}C$. $^{14}C$ is constantly being generated through the interaction of cosmic rays with the upper atmosphere at the rate of approximately 7.5 kilograms of $^{14}C$ per year. This radioactive carbon, in the form of $CO_2$ enters the "carbon cycle" as plants utilize $CO_2$ in the production of food. $^{14}C$ is constantly decaying with a half-life of approximately 5730 years. In the atmosphere where $^{14}C$ is constantly replenished, there is a constant ratio between the amount of $^{14}C$ and the isotopes of carbon. Thus, in all living matter, which is constantly interacting with the atmosphere through the carbon cycle, the ratio of $^{14}C$ to the other carbon isotopes remains essentially constant.

When a living organism dies, the organic matter which forms the organism no longer interacts with the atmosphere. Thus, over time, as the radioactive $C^{14}$ decays, the ratio between $^{14}C$ and the non-radioactive isotopes of carbon changes and this change in the ratio can be used to determine how long an assemblage of organic material has been dead.

The technique, as originally practiced, determined the concentration of $^{14}C$ by monitoring the radioactive beta decay of the $^{14}C$. The $^{14}C$ activity in living plants and animals and in the air is approximately fourteen disintegrations per minute per gram of carbon.

Monitoring of the beta decay of $^{14}C$ in a sample of dead organic matter allows the calculation of the amount of time which has passed since the plant or animal from which the organic matter is derived died.

Monitoring the decay of $^{14}C$ is an effective method of dating organic matter but the process has several limitations which, in many situations, can render the process inaccurate or impractical. Because of the relatively low radioactivity of normal inorganic matter, rather large samples, on the order of a gram, are required for the conventional process. These samples must be destroyed during the dating process and thus a significant portion of a test sample may have to be sacrificed in order to use the $^{14}C$ method. Further, because radioactive decay is a quantum mechanical phenomenon, the number of beta decays which a carbon sample emits will vary considerably from minute to minute and thus the sample must be monitored over a considerable period of time in order to achieve a statistically meaningful value for the amount of $^{14}C$ present.

The smaller the sample, the greater the amount of time required to determine the amount of $^{14}C$ present in the test sample by monitoring beta particle emission. At the same time, the older the sample the more sensitive the age-determination is to a precise measurement of the $^{14}C$ present, while at the same time, the lower overall activity of the sample. These physical limitations are combined with the practical limitations that many ancient artifacts in which there is interest in dating, such as the Shroud of Turin, are of such value that only extremely small samples can, in the interest of preservation, be submitted for destruction in the carbon-14 dating process.

The foregoing physical and practical limitations mean that $^{14}C$ dating by conventional methods is of limited practicality when the sample size available is small, the material to be dated is very old, the object to be dated is of great historical value, or a large number of objects must be dated to produce useful information. Additionally, where the carbon sample to be dated has become contaminated with modern carbon, it may be possible to find individual grains of carbonaceous material, which, if they could be tested, could be shown to be either modern or of the ancient material of interest.

To overcome these problems, methods and apparatus have been developed for utilizing a mass spectrometer for determining the amount of $^{14}C$ present in a sample, directly. Because all the $^{14}C$ atoms in a sample are available for detection, the ratio between $^{14}C$ and the other isotopes in a carbon sample can be rapidly determined for extremely small samples with a high degree of precision.

There are a number of practical difficulties associated with the use of a mass spectrometer to determine the isotopic ratios between $^{14}C$ and the other isotopes of carbon.

The measurement of the ratio of $^{14}C$ to $^{12}C$ is accomplished with the aide of a tandem accelerator. First, negative ions of carbon are formed from the sample to be tested. The sample may be as small as approximately 1 milligram of carbon. The negative ions are analyzed in a low energy negative ion mass spectrometer. They are then supplied to a tandem accelerator where they are accelerated to a few million electron volts so that molecular ions, such as $^{12}CH_2$— and $^{13}CH$—, can be eliminated. This elimination is accomplished by the passage of the ions through a long tube of high pressure gas, known as a stripping canal, located in the center of the tandem accelerator where the carbon ions lose four electrons to become triply charged positive ions. These ions are then accelerated further by the accelerator and then analyzed by another mass spectrometer system prior to the counting of the individual ions.

Each isotope of carbon forms part of the beam current produced by the accelerator. The $^{12}C$ makes up 99 percent of naturally occurring carbon. To first approximation the $^{12}C$ portion of the beam current produces 99 percent of the x-radiation and neutrons produced during the acceleration of the carbon isotopes.

U.S. Pat. No. 5,013,923 to Litherland, et al. discloses an apparatus which is placed before the tandem accelerator which separates the isotopes of carbon and any contaminating isomers into separate, physically spaced-apart beams, and then recombines the beams for injection into the tandem accelerator.

The recombinator described in the Litherland, et al. patent serves the stated function of the elimination of atoms and molecules of other masses by means of apertures at the midpoint of the recombinator.

Though not stated in the Litherland, et al. patent, the Litherland device is normally employed with a beam chopper which sequentially in time prevents the $^{12}C$ ion beam from entering the tandem accelerator. The function of the beam chopper is to attenuate the $^{12}C$ current so as to reduce the x-radiation and neutrons produced during the acceleration of the carbon isotopes.

Because the efficiency and function of the entire carbon-14 dating apparatus can fluctuate over a relatively short time period and because the precision of the ultimate measurement of $^{14}C$ must be made with respect to the amount of $^{12}C$ present, it is desirable that the measurements of the amount of $^{12}C$, $^{13}C$ and $^{14}C$ be simultaneously or/and closely sequenced in time, which is accomplished by the rapidly rotating beam chopper.

Southon, et al. describe, in their article, "Injection system for AMS: Simultaneous v Sequential," published in *Nuclear Instruments and Methods in Physics Research*, B52(1990), 370–374 North-Holland, another apparatus for separating an ion beam composed of $^{12}C$, $^{13}C$ and $^{14}C$ into spatially parallel beams where one or more of the beams may be eliminated before the beams are combined and injected into a tandem accelerator. The device described in the Southon, et al. paper, while functional, suffers from a difficulty in tuning. Southon, et al. describes the process of tuning as being "repeated until the operator was satisfied or his spirit was broken."

What is needed is an apparatus for allowing the sequential and simultaneous injection of carbon isotopes into a tandem accelerator for determining isotope ratios which is easy to tune.

SUMMARY OF THE INVENTION

The apparatus of this invention employs two spaced-apart dipole magnets. An ion beam from an ion source containing carbons of mass 12, 13 and 14, as well as hydrocarbon ions of mass 13 and 14 is directed into the first of the two dipole magnets. The ion beam is focused by an Einzel lens as it enters the first dipole magnet. The first magnet causes the beam to bend approximately 70 degrees, which separates the mass 12, 13 and 14 ions while at the same time focusing them in the X direction or deflection plane. The ions exit the first dipole magnet and then pass through a blanking plate device which can selectively remove one or two of the beams of mass 12, 13 and 14 ions. After leaving the first bending magnet, the mass 13 beam passes through a shielded tube in a steering device so the trajectory of the mass 13 beam is unaffected while the trajectories of the mass 12 and 14 ions are deflected by steering plates in the steering device. The steering plates deflect the beams a few degrees to bring them parallel to the mass 13 ion beam. The three parallel ion beams then pass through an electrostatic slot lens which focuses in the Y direction, that is, in the direction out of the bending plane. After passing through the slot lens, the mass 13 is again conducted by a shielded tube through a second steering device. The second device has steering plates which deflect the mass 12 and 14 beams in like amount to the first steering device. The beams then pass through a second blanking plate and enter a second dipole magnet which bends the beams to approximately 70 degrees wherein the beams are combined where they exit from the second dipole magnet.

The combined beam enters an Einzel lens where the beam is focused in preparation for injection into a tandem accelerator. The faces of the dipole magnets are substantially normal to the beam path and are shaped to minimize the second order effect of the magnets on the ion beam.

It is an object of the present invention to provide an apparatus for spatially separating the isotopes of carbon and recombining them for injection into a tandem accelerator.

It is another object of the present invention to provide an apparatus and method for obtaining improved accuracy in the $^{14}C$ dating process.

It is a further object of present invention to provide an apparatus for separating and recombining charged particle beams which is easy to tune.

Further objects, features and advantages of the invention will be apparent from the following detailed description when taken in conjunction with the accompanying drawings.

BRIEF DESCRIPTION OF THE DRAWINGS

FIG. 1 is a schematic drawing of the apparatus of this invention.

FIG. 2 is a plan view in cross-section of a portion of FIG. 1.

FIG. 3 is a cross-sectional elevational view of the central slot lens of FIG. 1.

FIG. 4 is a detailed cross-sectional plan view showing the operation of the central portion of the apparatus of FIG. 1.

DESCRIPTION OF THE PREFERRED EMBODIMENT

Figure 5:
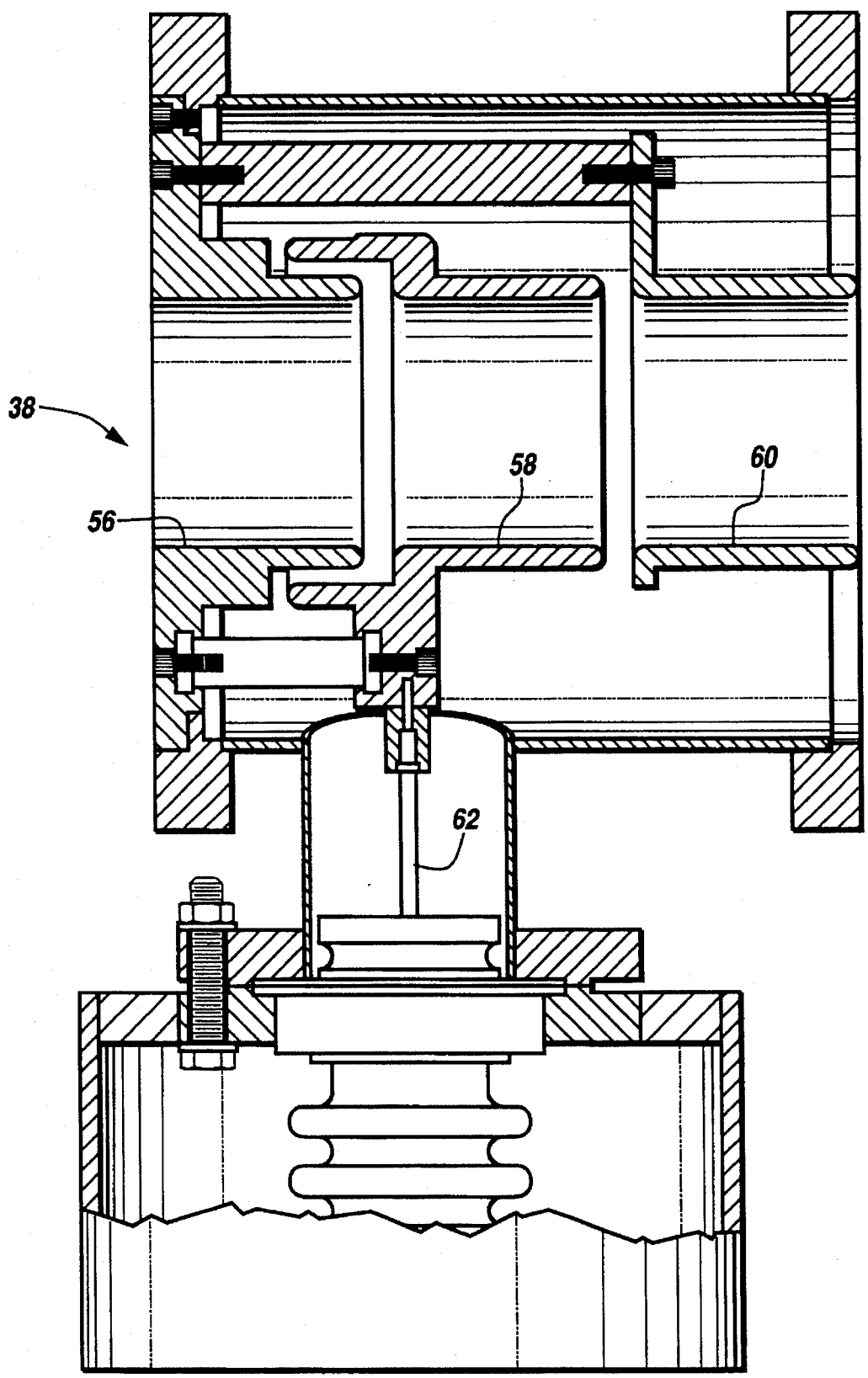
FIG. 5 is a detailed cross-sectional view of the Einzel lens of FIG. 2.

Referring more particularly to FIGS. 1–5, wherein like numbers refer to similar parts, a static-magnetic transport system 20 is shown in FIG. 1. The purpose of the apparatus 20 is to transport an ion beam 22 from the output 24 of an ion source (not shown) to the input 26 of a tandem accelerator 23 shown in part schematically in FIG. 8. The transport system, at the same time it performs the function of transporting the ion beam 22, separates the ion beam into a first ion beam 28 composed of ions of molecular weight 12, a second ion beam 30 composed of ions of molecular weight 13, and a third ion beam 32 composed of ions of molecular weight 14. When the ion beams are separated as shown schematically in FIG. 1 it is possible to selectively remove one of the beams 28, 30, 32. In the case where it is desirable to tune or focus the individual beams 28, 30, 32 a blanking plate or shutter 34 may be used to selectively block one or more of the beams.

Figure 8:
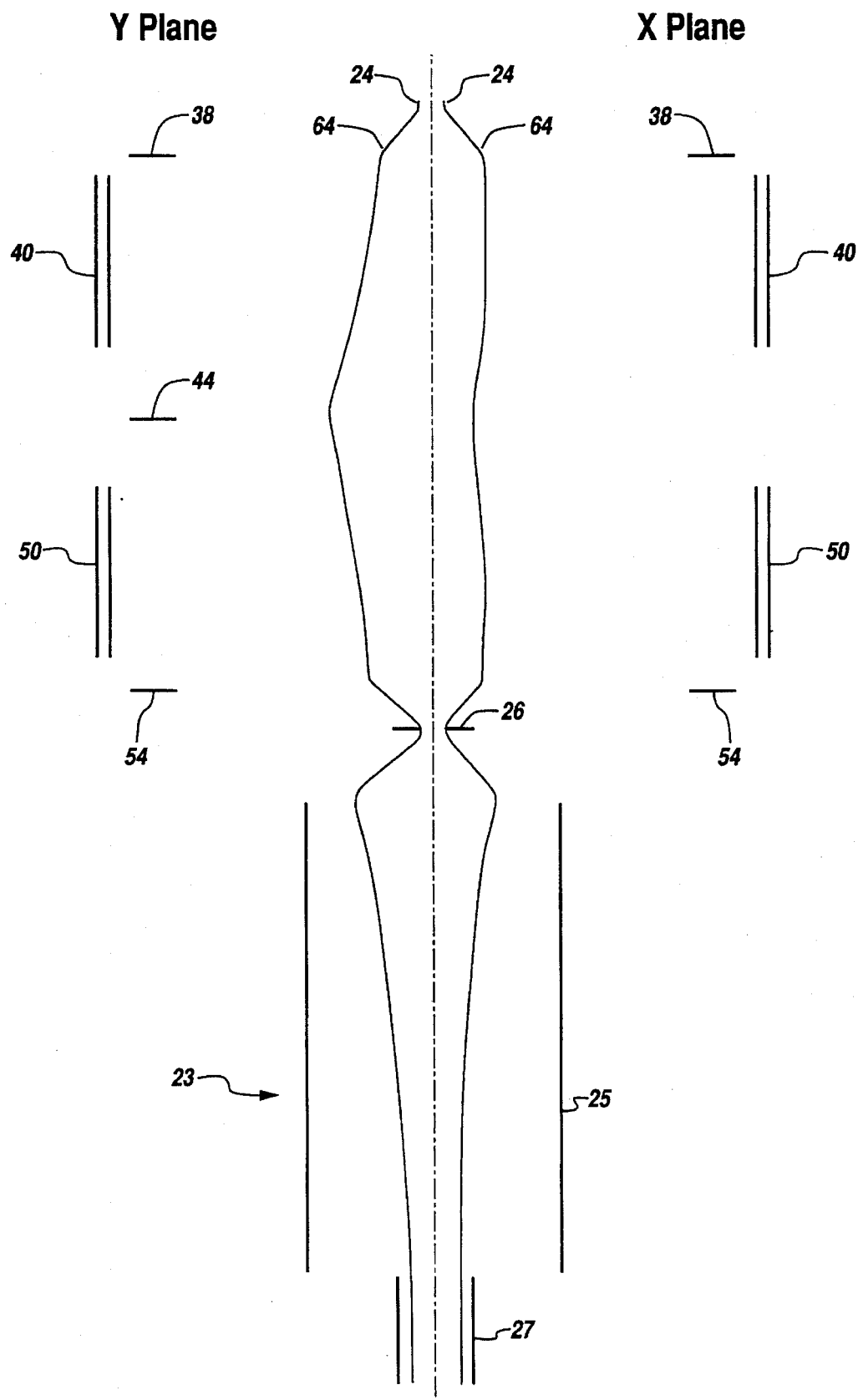
FIG. 8 is a schematic view of the beam profile as it transits the apparatus of FIG. 1 and enters the tandem accelerator employed therewith.

The overall function of the device 20 is to facilitate determining the ratios between $^{12}C$, $^{13}C$ and $^{14}C$. The ion source (not shown) which is used to produce negative ions from a source of carbon which it is desired to analyze, produces a certain quantity of molecular ions such as $^{12}CH_2-$ and $^{13}CH-$ which must be eliminated before the true ratios between the carbon isotopes can be determined with a mass spectrometer. Thus, negative ions of $^{12}C$, $^{13}C$ and $^{14}C$ and any molecular ions are accelerated to a few million electron volts along a acceleration column 25 of limiting aperture and relative length as shown in FIG. 8. The negative ions are accelerated to the central high voltage electrode of a tandem accelerator such as may be constructed using a dual column electrostatic generator similar to the one shown in U.S. Pat. No. 3,469,118 to Herb et al.

At the high voltage electrode the ions are sent through a stripping tube 27 shown in part in FIG. 8 which breaks down molecular species and triple ionizes the carbon ions. Alternatively, the ions may be sent through a foil (not shown). The positive ions of carbon are now accelerated along the second acceleration column of the tandem accelerator. After the positive carbon ions are accelerated they are analyzed by a high energy mass spectrometer. While the currents of the abundant $^{12}C$ and $^{13}C$ ion beams are measured, the far more rare $^{14}C$ ions are individually detected by an ion detector positioned to receive the ions. Carbon naturally occurring in living matter is composed of ninety-nine percent $^{12}C$, one percent $^{13}C$ and an amount of $^{14}C$ measured in parts per trillion.

In theory, an accelerator system can be built which can accept all ions coming from pre-acceleration spectrometer, accelerate, breakup, strip, accelerate again and sort the accelerated ions out a post accelerator spectrometer. In practice, accelerating all the $^{12}C$ ions causes X-ray and neutron intensity around the accelerator to be high. Therefore, to limit necessary shielding and the requirement for remote operation it is current art to permit only a small fraction, about 1 percent of the $^{12}C^-$ beam to enter the accelerator.

Thus, the transport apparatus 20 is designed to facilitate simultaneously feeding the $^{14}C$ and $^{13}C$ beams to the tandem accelerator while at the same time allowing the time modulating of the $^{12}C$ beam. In operation, the $^{13}C$ is measured and $^{14}C$ beam is detected at all times and $^{12}C$ is measured only a small part of the time. Because of the very low presence of $^{14}C$ the detection rate for $^{14}C$ may be as little as a few ions per minute. It is desirable to monitor the ratio of $^{14}C$ to $^{13}C$ continuously while at the same time periodically determining the $^{12}C$ to $^{13}C$ ratio.

The beam transport system 20 provides three functions: First, transporting the beam from the ion source to the tandem accelerator. Second, permitting the deflection of the $^{12}C$ beam into a Faraday cup 36 thus preventing the $^{12}C$ beam from entering the tandem accelerator so as to keep the average current of $^{12}C$ ions low i.e. about the same as the $^{13}C$ ion current. And third, providing a system which provides for rapid and simple tuning of the beam transport system, thus facilitating the set-up and use of the system 20.

Referring to FIG. 1, the basic transport system 20 is in communication with an ion source outlet 24 which provides an ion beam 22 which enters an Einzel lens 38 shown diagrammatically in FIG. 1 and in cross-section in FIGS. 2 and 5. The Einzel lens provides focusing of the ion beam 22 before it is injected into the first dipole magnet 40 shown diagrammatically adjacent to the Einzel lens 38 in FIG. 1 and in FIGS. 2 and 7.

The dipole magnet, in accordance with the well understood principles of physics, causes the negative ions to follow curved paths. The amount of curvature is dependant on the energy or velocity of the charged particles, the strength of the magnetic field, and the mass of the individual particles. Since the forces acting on the charged particles are substantially the same, the heavier particles follow paths of greater radius. Thus the $^{14}C$ beam 32 is bent the least and the $^{12}C$ beam 28 is bent the most.

After leaving the first dipole magnet 40 the ion beams 28, 30, 32, are no longer under the influence of the magnetic field produced by the dipole magnet 40, and thus follow straight line paths which diverge. The beam blanking plate 34 allows one or more of the ion beams 28, 30, 32 to be intercepted and blocked to facilitate the tuning of the device 20 by tuning it with respect to each beam 28, 30, 32 sequentially. Following the blanking plate 34 two pair of steering plates 43, 42 deflect the $^{12}C$ beam 28 and the $^{14}C$ beam 32 to be parallel with the central $^{13}C$ beam 30. The three parallel ion beams then enter an electrostatic slot lens 44 which provides focusing in the y-plane which is defined as perpendicular to the path of the ion beams and perpendicular to the plane containing the three ion beams. After traversing the slot lens 44 a second pair of steering plates 47, 46 deflect the $^{12}C$ beam 28 and the $^{14}C$ beam 32 by an amount and in a direction identical to the deflection plates 43, 42 thus causing the $^{12}C$ and $^{14}C$ beams to converge towards the $^{13}C$ beam.

The carbon beams then pass through a second blanking plate or shutter 48 where they enter a second dipole magnet 50 which is the mirror image of the dipole magnet 40. The ion beams 28, 30, 32 enter the magnet 50 on trajectories which are substantially the reverse of the trajectories on which they exit the magnet 40, such that the curvature produced by the magnetic field of the magnet 50 causes the three ion beams to recombine to form a recombined beam 52 which then enters a second Einzel lens 54 which focuses the ion beam 52 for injection into the tandem accelerator inlet 26.

The individual components which make up the transport device are now discussed and their contributions to the three functions performed by the transport device 20 are examined, the functions being that of transporting the beam, selective removal of $^{12}C$ from the beam, and facilitating focusing and tuning of the device 20.

The ion beam 22, by way of example, leaves the ion source outlet 24 with a normalized emittance of about 5.74 $\pi$ mm milliradians $(MeV)^{1/2+1}$ at a total energy of 81 kev. The beam 22 tends to become unfocused primarily because of the divergence of ions from the source. The Einzel lens 38, as best shown in FIG. 5, utilizes three cylindrical conducting lens elements. The first lens element 56 and the third lens element 60 are held at ground potential while the second lens element 58 is connected to a source 62 of high voltage potential.

The ion beams, as they transit between the first lens element 56 and the second lens element 58 and the third lens element 60, experience a net focusing effect caused by the electrostatic gradient between the lens elements. The effect of the Einzel lens 38 on the beam profile is shown in FIG. 8 where the divergent beam of carbon ions from the source 24 is substantially reduced at 64 in both the x and y planes of the beam profile of FIG. 8.

As shown in FIGS. 1 and 2, after the ion beam leaves the Einzel lens 38 it enters the dipole bending magnet 40. Each dipole magnet has an inlet face 66 and an outlet face 68. The inlet face 66 and outlet face 68 have a curvature to reduce second-order effects on the beam 22. The use of such inlet and outlet conditions on dipole magnets to minimize second-order effects is well understood by those skilled in the art and it is described in such standard art references as "Focussing of Charged Particles", vol. 2, ed. Albert Septier, 1968, Academic Press.

Figure 7:
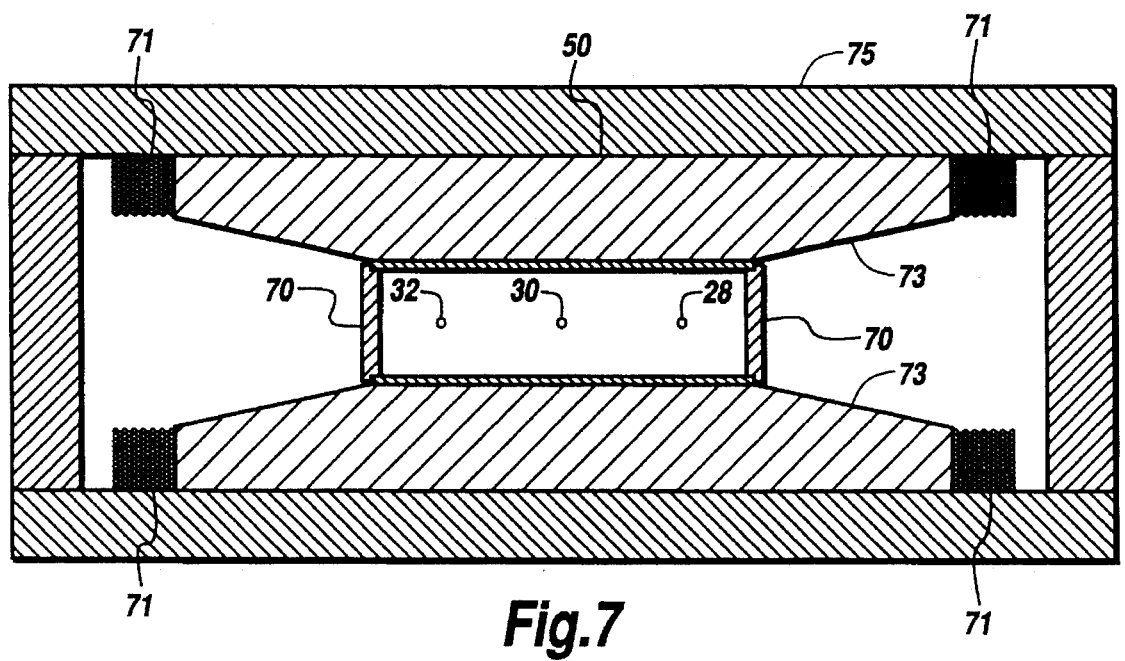
FIG. 7 is an end-elevational cross-sectional view of the bending magnet of FIG. 1 taken along lines 7—7 of FIG. 1.

In FIG. 2 a vacuum beam pipe 70 has been shown without the dipole magnet poles which are shown in FIG. 7. The beam pipe may employ a port 72 to facilitate optical alignment of the system.

A device such as shown in U.S. Pat. No. 3,789,298 to Herb is particularly useful in determining an ion beam profile and may be placed anywhere within the transport system 20 without blocking a significant portion of the transmitted beam. In particular, such a beam profile analyzing device will normally be employed at the tandem accelerator inlet 26 to facilitate tuning the overall device 20.

Figure 6:
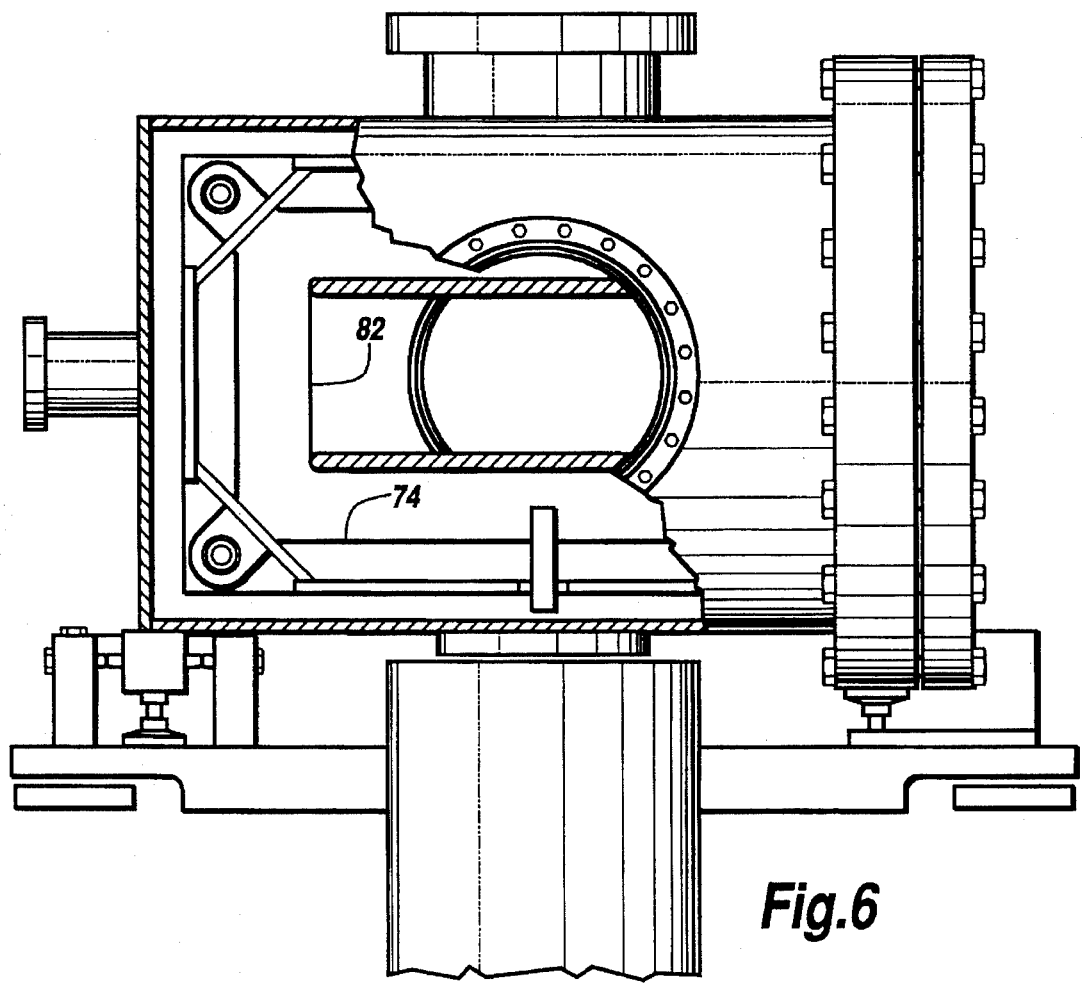
FIG. 6 is a side-elevational view partly cut away of the slot lens of FIG. 3.

As shown in FIG. 7 the magnet is a simple dipole magnet in which an electric coil 71 energizes the magnet 40. The magnet 40 has pole pieces 73 which may be integral or for manufacturing convenience may be made separately from the magnetic return 75. The magnet 40 provides for adjustability of the magnetic forces and thus the amount of curvature of the ion beams 28, 30, 32 produced by the magnet 40. The magnet 40, in accordance with well understood principles of magnetic optics, provides a focusing effect in the X-plane, that is in the plane defined by the curved paths of ion beams 28, 30, 32. Because no focusing function is provided in the Y-plane, a slot lens 44, as shown in FIGS. 3 and 6, is employed.

The slot lens 44 is similar in design and effect to an Einzel lens, only it is designed to provide focusing in the Y-plane only. In FIG. 2 the Einzel lens 38, the bending magnet 40, the blanking plate 38, and the steering plates 43, 42 are all shown in a plan view of the bending plane. FIG. 3 utilizes a more illustrative front elevational view, which in combination with the cross-sectional view of FIG. 6 facilitates the understanding of the function of a slot lens 44.

The slot lens 44 is constructed of three pairs of plates; a first pair of plates 74 which are held at ground potential; a second pair of plates 76 which are connected to a source of high voltage potential 77; and a third pair of plates 78 which are, again, held at ground potential. The slot lens plates 74, 76, 78 have horizontally extending lips 80 which define the upper and lower bounds of rectangular openings 82, best shown in FIG. 6. The form of the slot plates results in a static field which causes focusing in the Y-plane or plane normal to the bending plane of the $^{12}C$, $^{13}C$ and $^{14}C$ beams.

The blanking plates 34, as shown in FIG. 4, consist of aperture plates 84, 85 which are mounted on expansion bellows (not shown). The expansion bellows may be used to drive the plates 84, 85 to obstruct individual beams 28, 30, 32. The bellows may be made to expand and drive plates 84, 85 with oil or gas. By extending both the upper plate 84 and the lower plate 85 the $^{13}C$ beam 30 alone can be allowed to pass through the blanking plate 34 and by extending either the upper or lower plate either the $^{12}C$ beam 28 or the $^{14}C$ beam 32 may be selected. The aperture plates 84, 85 are insulated by insulators which make possible the rough measurement of the current in the beams stopped by the plates 84, 85.

As shown in FIG. 4 pairs of deflection plates 43, 42 cause the $^{12}C$ beam 28 and the $^{14}C$ beam 32 to be deflected two or three degrees towards the $^{13}C$ beam 30 such that the $^{12}C$ beam 28 and the $^{14}C$ beam 32 become parallel with the $^{13}C$ beam 30. The deflecting plates 43, 42 may be angled outwardly approximately one degree from the reference direction defined by the $^{13}C$ beam 30. The second pair of deflection plates 47, 46 deflect the beam, as shown in FIG. 4, such that the $^{12}C$ beam 28 and the $^{14}C$ beam 32 are convergent after passing through the second pair of convergent plates 47, 46 by an amount which is equal to the divergence of the beams as they enter the first pair of steering plates 43, 42.

The identity of the amount of steering produced by the $^{14}C$ steering plates 42, 46 means that the plates may be connected to a single source of high voltage potential, similarly the $^{13}C$ steering plates 43, 47 are connected to a single source of high voltage potential. This facilitates the tuning of the transport system 20 because only a single voltage or current source need be adjusted in order for each of the ion beams 28, 30, 32 to transit the transportation system 20. The mass 13 beam path is adjusted by the current in the coils 71, and the mass 12 and 14 beams paths are adjusted by steering plate voltages.

A shielded tube 90 prevents the $^{13}C$ beam 30 from being deflected by the electrostatic fields generated by the steering plates 42, 46.

As has been previously discussed, it is desirable to attenuate or completely block the passage of the $^{12}C$ ion beam 28 through the transport system 20 during the majority of the time a transport system 20 is functioning so as to lower the average current of the $^{12}C$ ion beam.

Although in the past a rotating shutter has been used periodically to occlude the $^{12}C$ beam, any such mechanical occlusion system is of limited flexibility and requires a rapidly moving mechanical system to be positioned within a high vacuum enclosure which reduces reliability. The set of deflection plates 42 through which the $^{12}C$ beam 28 passes are utilized in combination with a separate high voltage power supply (not shown) to deflect the $^{12}C$ beam 28 along a divergent path 86 into a faraday cup 36. This arrangement allows the rapid and repeated removal of the $^{12}C$ beam 28 from the recombined ion beam 52. In this manner, a purely electrostatic means, in combination with a controller, can be used to control the frequency and duration during which the $^{12}C$ beam 28 is allowed to enter the tandem accelerator. This control facilitates the ability to detect the $^{14}C$ particles, over an extended period of time, while periodically allowing the $^{12}C$ beam 28 to be compared with the $^{13}C$ beam 30. Thus the determination of the ratios between $^{12}C$, $^{13}C$ and $^{14}C$ are accurately determined despite drifts in, or even rapid changes in, the ion source output.

Because of the very high signal strength of the $^{12}C$ beam, only very short periods of transmission through the tandem accelerator are required to determine with high statistical significance the relative abundance of $^{12}C$ to $^{13}C$.

It should be understood the Einzel lenses 38, 54 may be connected to a single power source and, in a similar fashion, the dipole electric magnets 40, 50 may be connected to a single power source and, in turn, the steering plates 42, 46 may be connected to a single power source and thus greatly facilitate the tuning of the system 20. In tuning the device, the Einzel lenses 38 and 54 may be adjusted by observing the beam profile at 26 and adjusting the voltage on both high voltage elements until the beam is focused in the x plane as the electromagnets are adjusted in tandem until the $^{13}C$ beam 30 passes through the system 20. Hence, the blocking plates 84, 85 may allow the passage of the $^{12}C$ beam and the steering plates 43, 47 adjusted in tandem until the beam profile monitor, at the tandem accelerator entrance 26, determines the beam 28 is passing properly through the system. Similarly, the mass 14 ion beam 32 is adjusted by using its steering plates 42, 46 while blocking the $^{12}C$ and $^{13}C$ beams. The slot lens 44 may then be adjusted to focus the y-plane of the beam profile at 26, and, finally, the Einzel lens 54 may be readjusted to focus the ion beam 26 for injection into the tandem accelerator.

It will be understood that the $^{14}C$ ions will be too few to be observed by the beam profile monitor (not shown) at the entrance 26 to the tandem accelerator. However molecular ions of mass 14 which are present in sufficient numbers can be observed by the beam profile monitor (not shown) thus allowing the correct transport of $^{14}C$ ions to be assured.

It should be understood that although the dipole magnets 40, 50 have been disclosed as bending the beam through approximately seventy degrees, dipole magnets bending the beam through various angles could be used.

It should also be understood that wherein making the Einzel lenses 38, 54, the electromagnets 40, 50 and the deflection plates 42, 46 symmetric about the slot lens 44 facilitates the construction and tuning of the transport system 20, other configurations coming within the scope of the claims could be utilized.

It should also be understood that although the transport system 20 is described and illustrated for use with the isotopes of carbon, the principles disclosed herein could be utilized in the construction of a transport system for other ion systems of a similar nature, including those now known to the art and those that become known at a later date.

It is understood that the invention is not limited to the particular construction and arrangement of parts herein illustrated and described, but embraces such modified forms thereof as come within the scope of the following claims.

I claim:

1. A static-magnetic transport system for use with an ion beam composed of at least ions of two different momentums which are injected into a tandem accelerator, comprising:
    a) a first electrostatic focusing lens having an ion beam inlet and an ion beam outlet;
    b) a first dipole bending magnet having an input end relative to the beam outlet of the first electrostatic focusing lens and a output end, wherein the ion beam enters the input end and leaves the first magnet at the output end, the first magnet bending the ion beam about an angle sufficient to separate the ions of differing momentum, and to create at least a first ion beam and a second ion beam of differing momentums;
    c) a first deflection means spaced from the output end of the first dipole bending magnet, the deflection means for deflecting the first ion beam a first amount, so as to be substantially parallel to the second ion beam;
    d) a second electrostatic focusing lens spaced from the first deflection means;
    e) a second deflection means spaced from the second electrostatic lens, the second deflection means for deflecting the first ion beam a second amount so that the first ion beam and the second ion beam converge;
    f) a second dipole bending magnet being spaced from the first magnet, the first and second deflection means being between the first and second bending magnets, the second electrostatic lens being spaced between the first and second deflection means, the second magnet having an input end and an output end, wherein the first and the second ion beams enter the input end and said first and second ion beams leave the second magnet at the output end substantially at the same point in space, the second magnet bending the first and second ion beams about an angle sufficient to recombine the first and second ion beams to form an injection ion beam for injection into the tandem accelerator;
    g) a means spaced between the first and second bending magnets for causing at least a selected one of said first and second ion beams not to enter the second bending magnet, so that ions of said selected ion beam a selectively removed from the injection ion beam; and
    h) a third electrostatic focusing lens having an ion beam inlet and an ion beam outlet being spaced from the second dipole bending magnet to focus the injection ion beam into the tandem accelerator.

2. The apparatus of claim 1 wherein the first dipole bending magnet creates at least said first ion beam, said second ion beam, and a third ion beam each of differing momentums; the first deflection means for deflecting at least the first and third ion beams the first amount, so each of the first and third ion beams is substantially parallel to the second ion beam; the second deflection means for deflecting at least the first ion beam and the third ion beam the second amount so that the first and third ion beams converge; the second dipole magnet bending the first, second and third ion beams about an angle sufficient to recombine the first, second and third ion beams to form the injection ion beam for injection into the tandem accelerator.

3. The apparatus of claim 1 wherein the second electrostatic focusing lens is a slot lens and wherein the static-magnetic transport system is symmetric about the slot lens.

4. The apparatus of claim 1 wherein the first deflection means incorporates a shielding means which facilitates the undeflected passage of the second ion beam.

5. The apparatus of claim 4 wherein the second deflection means includes a second shielding means which facilitates the undeflected passage of the second ion beam.

6. The apparatus of claim 1 wherein the first dipole bending magnet causes the ion beam to follow a curved path of approximately seventy degrees and wherein the second dipole bending magnet causes the first and second ion beams to follow a curved path of approximately seventy degrees.

7. The apparatus of claim 1 wherein the first and second deflecting means comprises an apparatus having a first pair of steering plates for the first ion beam, and a second pair of steering plates for the third ion beam and spaced therebetween is a shielded conduit for the passage of the second ion beam.

8. The apparatus of claim 7 wherein the means for selectively causing utilizes a Faraday cup mounted on the second deflecting means for causing convergence and utilizes the first steering plates to cause the first ion beam to be deflected into the Faraday cup and so be removed from the injected ion beam.

9. The apparatus of claim 1 wherein the first and third electrostatic lenses are Einzel lenses.

10. A static-magnetic transport system for use in an ion beam which defines a direction of propagation, the ion beam composed of negative ions of molecular weights 12, 13, and 14, having similar energy and thus varying momentums which are injected into a tandem accelerator for $^{14}C$ dating of previously living matter, comprising:
    a) a first Einzel lens;
    b) a first magnetic means spaced from the first Einzel lens in the direction of propagation of the ion beam for causing separation of the ions of varying momentum by causing the ion beam to follow a curved path with a radius of curvature that is momentum-dependent, and to create a first ion beam of molecular weight 12, a second ion beam of molecular weight 13, and a third ion beam of molecular weight 14;
    c) a first deflection means spaced in the direction of propagation from the first magnetic means, the deflection means for deflecting the first and third beams so as to be parallel to the second ion beam;
    d) a second deflection means spaced in the direction of propagation from the first deflection means, the second deflection means for deflecting the first ion beam and the third ion beams to converge with the second ion beam;
    e) an electrostatic slot lens spaced between the first deflection means and the second deflection means;
    f) a second magnetic means spaced in the direction of propagation from the second deflection means, the second magnetic means for causing recombination of the ions of varying momentum by causing the first, second and third ion beams to follow curved paths with radiuses of curvature that are momentum dependent thus recombining the first ion beam, the second ion beam, and the third ion beam, into an injection ion beam;

g) means for selectively causing the first ion beam not to enter the second magnetic means, the means for selectively causing being spaced between the first magnetic means and the second magnetic means, so that ions of the molecular weight 12 are selectively with respect to time removed from the injection ion beam which is injected into the tandem accelerator; and h) a second Einzel lens spaced in the direction of propagation from the second magnetic means, the second Einzel lens for focusing the injection ion beam.

11. The apparatus of claim 10 wherein the first and second magnetic means are dipole bending magnets.

12. The apparatus of claim 11 wherein the first dipole bending magnet causes the ion beam to follow a curved path of approximately seventy degrees and wherein the second dipole bending magnet causes the first, second and third ion beams to follow a curved path of approximately seventy degrees.

13. The apparatus of claim 11 wherein the static-magnetic transport system is symmetric about the slot lens.

14. The apparatus of claim 10 wherein the first deflection means incorporates a shielding means which facilitates the undeflected passage of the second ion beam.

15. The apparatus of claim 14 wherein the second deflection means includes a second shielding means which facilitates the undeflected passage of the second ion beam.

16. The apparatus of claim 10 wherein the first and second deflecting means comprises an apparatus having a first pair of deflection plates for the first ion beam, and a second pair of deflection plates for the third ion beam and spaced therebetween a shielded conduit for the passage of the second ion beam.

17. The apparatus of claim 16 wherein the means for selectively causing utilizes a Faraday cup mounted on the second deflection means and utilizes the first steering plates to cause the first ion beam to be deflected into the Faraday cup and so be removed from the injected ion beam.

18. A static-magnetic transport system for use in an ion beam which defines a direction of propagation, the ion beam composed of negative ions of molecular weights 12, 13, and 14, having similar energy and thus varying momentums which are injected into a tandem accelerator for $^{14}C$ dating of previously living matter, comprising:

a) first Einzel lens;

b) a first dipole magnet of strength to deflect the ion beam to follow a curved path of approximately 70 degrees spaced from the first Einzel lens in the direction of propagation;

c) a first set of electrostatic deflection plates spaced in the direction of propagation from the first dipole magnet, the deflection plates for deflecting a first and a third ion beams so as to be parallel to a second ion beam;

d) a second set of electrostatic deflection plates spaced in the direction of propagation from the first set of deflection plates, the second set of electrostatic deflection plates for deflecting the first and third ion beams so as to converge with the second ion beam;

e) an electrostatic slot lens spaced between the first set of deflection plates and the second set of deflection plates;

f) a second dipole magnet of strength to deflect the first, second and third ion beams to follow a curved path of approximately 70 degrees spaced from the second set of electrostatic deflection plates in the direction of propagation;

g) a second Einzel lens spaced in the direction of propagation from the second dipole magnet, and h) wherein the first set of electrostatic plates are comprised of plates for deflecting ions of mass 12 and plates for deflecting ions of mass 14, and wherein the plates for deflecting mass 12 ions form a means for selectively causing the first ion beams not to enter the second dipole magnet means so that ions of molecular weight 12 are selectively with respect to time removed from an ion beam which is injected into the tandem accelerator.

19. The apparatus of claim 18 wherein the static-magnetic transport system is symmetric about the slot lens.

20. The apparatus of claim 18 further comprising a first shielding means which facilitates the undeflected passage of the second ion beam through the first set of electrostatic deflection plates.

21. The apparatus of claim 20 further comprising a second shielding means which facilitates the undeflected passage of the second ion beam through the second set of electrostatic deflection plates.

22. The apparatus of claim 18 further comprising a Faraday cup mounted adjacent to the second set of electrostatic deflection plates for selectively receiving the first ion beam and removing the first ion beam from the injected ion beam.

* * * * *

UNITED STATES PATENT AND TRADEMARK OFFICE
CERTIFICATE OF CORRECTION

PATENT NO. : 5,534,699
DATED : July 9, 1996
INVENTOR(S) : James A. Ferry

It is certified that error appears in the above-identified patent and that said Letters Patent is hereby corrected as shown below:

In column 6, line 33, change "$(MeV)^{1/2+1}$ at a total energy" to -- $(MeV)^{1/2}$ at a total energy --.

In the abstract, line 2, change "of mass 2, 13 and 14" to -- of mass 12, 13 and 14 -- .

Signed and Sealed this

Sixteenth Day of February, 1999

Attest:

Attesting Officer

Acting Commissioner of Patents and Trademarks